United States Patent [19]
Koike et al.

[11] Patent Number: 5,722,370
[45] Date of Patent: Mar. 3, 1998

[54] ENGINE OPERATION CONTROL SYSTEM

[75] Inventors: Takashi Koike; Kazumasa Itoh, both of Hamamatsu, Japan

[73] Assignee: Sanshin Kogyo Kabushiki Kaisha, Shizuoka-ken, Japan

[21] Appl. No.: 745,965

[22] Filed: Nov. 8, 1996

[30] Foreign Application Priority Data

Nov. 8, 1995 [JP] Japan ................................. 7-289788

[51] Int. Cl.⁶ .................................................. F02P 5/06
[52] U.S. Cl. .................................................. 123/418
[58] Field of Search ........................... 123/418, 406, 123/422, 423, 419

[56] References Cited

U.S. PATENT DOCUMENTS

| | | | |
|---|---|---|---|
| 4,747,382 | 5/1988 | Suzuki et al. | 123/418 |
| 4,966,115 | 10/1990 | Ito et al. | 123/418 |
| 5,070,840 | 12/1991 | Kanno et al. | 123/418 |
| 5,513,612 | 5/1996 | McAbee et al. | 123/414 |

*Primary Examiner*—Raymond A. Nelli
*Attorney, Agent, or Firm*—Knobbe, Martens, Olson & Bear, LLP

[57] ABSTRACT

An engine operation control system which controls ignition timing is disclosed. The system fires all ignition elements simultaneously, at least one of the ignition elements being fired effectively and all other ignition elements fired ineffectively in accordance with a first firing advance, and at least another of the ignition elements fired effectively and all other ignition elements ineffectively in accordance with a second firing advance, the first and second firing advances being determined independently of one another in order that the timing of the effective firing of each ignition element is optimized.

6 Claims, 7 Drawing Sheets

ENGINE OPERATION CONTROL SYSTEM

FIELD OF THE INVENTION

The present invention relates to an engine operation control system of the type which controls ignition timing.

BACKGROUND OF THE INVENTION

In an internal combustion engine the intake, exhaust, and cooling system layout, among other factors, influence the optimum time for firing the ignition element to initiate combustion in the combustion chamber. It is desirable to fire the ignition element corresponding to each combustion chamber of a multiple combustion chamber engine at the optimum time for that chamber, but the optimum time for firing each ignition element may vary from chamber to chamber.

In most engine control systems, a mechanism is provided for firing each ignition element independently. These systems have the drawback however, that they must include a mechanism for distinguishing between the ignition elements of the combustion chambers so that each ignition element can be fired independently at the correct time.

In other systems, all ignition elements are fired simultaneously at fixed firing intervals. For example, in a two-cylinder engine, the ignition elements corresponding to the first and second cylinders are both fired every one hundred eighty degrees. At each ignition firing, one of the ignition elements is fired effectively, meaning that the cylinder is in a state prepared for combustion. At the same time, the other ignition element is fired ineffectively, in that the cylinder corresponding thereto is not in a state prepared for combustion. This arrangement has the benefit that no distinguishing mechanism is required. This method of engine control has the drawback, however, that since the ignition elements are fired at fixed intervals, optimizing the individual firing time for each ignition element is not accomplished.

It is desirable to provide an ignition control system in which each ignition element is effectively fired at the optimum time, but which does not require a mechanism for distinguishing the ignition elements corresponding to the cylinders.

SUMMARY OF THE INVENTION

In accordance with the present invention, there is provided an engine operation control system for use with an internal combustion engine having at least two variable volume combustion chambers, each chamber having an ignition element corresponding thereto. The engine operation control system controls the firing of each ignition element. The engine operation control system includes a first control means for controlling the firing of the ignition elements when the engine is operating in a first operating speed range, and a second control means for firing said ignition elements when the engine is operating at a speed above said first operating speed range. The first control means controls the simultaneous firing of the ignition elements at equal intervals, and the second control means controls the simultaneous firing of the ignition elements at intervals which may be unequal.

In accordance with a method of the present invention, one of the ignition elements is fired effectively and all other ignition elements ineffectively in accordance with a first firing advance, and another of the ignition elements is fired effectively and all other ignition elements ineffectively in accordance with a second firing advance, the first and second firing advances being determined independently of one another. In this manner, all ignition elements are fired simultaneously, at least one being fired effectively (i.e. resulting in combustion) and the others being fired ineffectively (i.e. at a time which does not result in combustion). The firing timing is adjusted, at least during one engine operational speed range, such that the firing advance corresponding to when the at least one ignition element firing is effective is independent of the firing advance for when the firing of the other ignition elements is effective. In this manner, while all ignition elements are fired simultaneously so as to avoid the need for a distinguishing mechanism, the effective firing of each ignition element is optimized.

Further objects, features, and advantages of the present invention over the prior art will become apparent from the detailed description of the drawings which follows, when considered with the attached figures.

DETAILED DESCRIPTION OF THE PREFERRED EMBODIMENT

Figure 1:
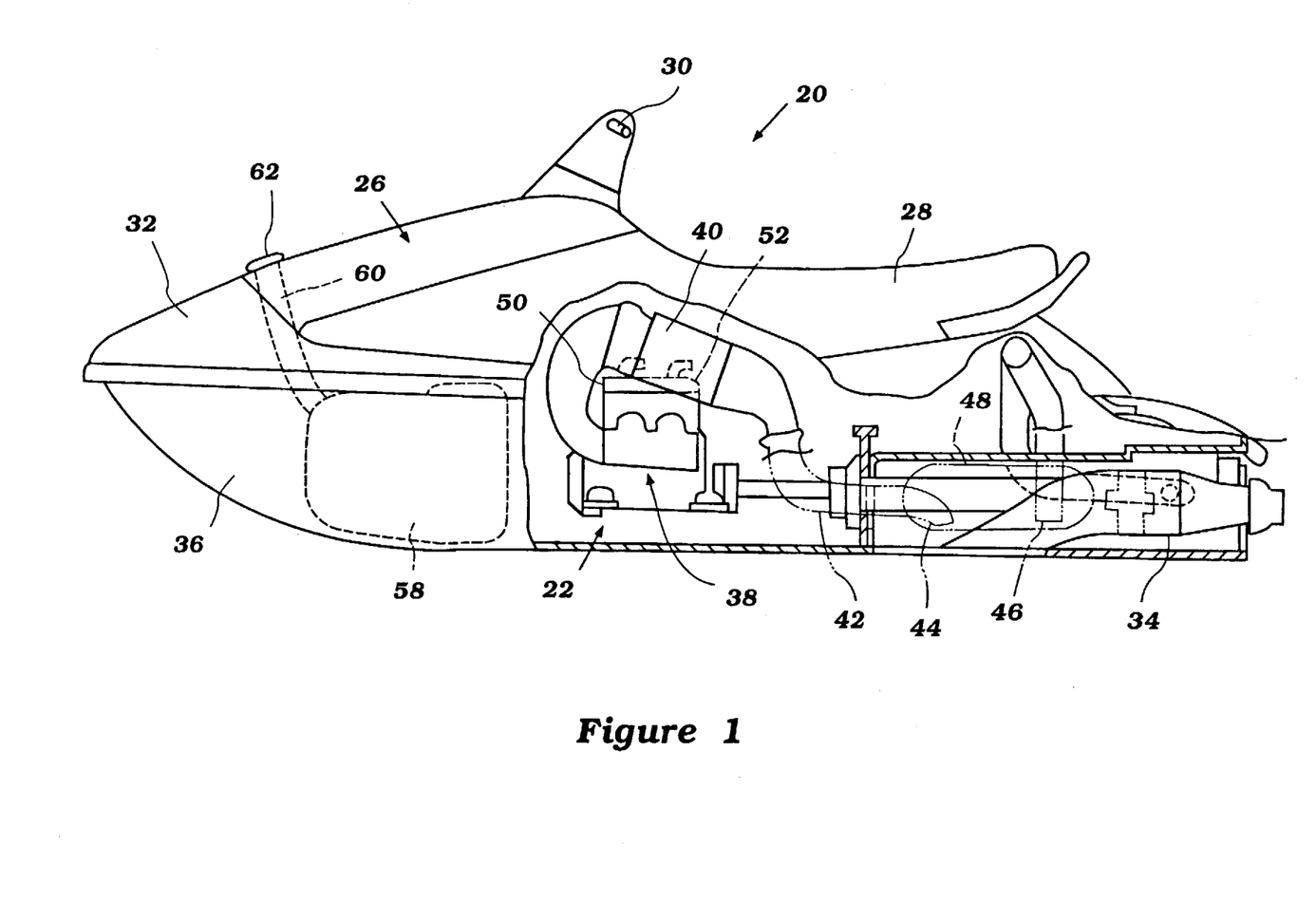
FIG. 1 is a side view, in partial cross-section, of a watercraft containing an engine of the type with which the engine operation control system of the present invention is useful.

FIG. 1 illustrates a watercraft 20 powered by an engine 22 of the type with which an engine operation control system 24 (see FIG. 5) in accordance with the present invention is useful. In general, the watercraft 20 includes a hull 26 having a top portion 32 and a lower portion 36. A seat 28 is positioned on the top portion 32 of the hull 26. A steering handle 30 is provided adjacent the seat 28 for use by a user in directing the watercraft 20.

The hull 26 defines therein an interior space in which is positioned the engine 22. The engine 22 has an output which rotationally drives a propulsion unit 34 which extends out a rear end of the lower portion 36 of the hull 26.

Fuel is supplied to the engine 22 from a fuel tank 58 positioned within the hull 26 of the watercraft 20 forward of the engine 22. This fuel tank 58 has a fill line 60 extending to an external port 62. Fuel is supplied from the tank 58 to the engine 22 through an appropriate fuel line (not shown). An combustion air supply is also provided to the engine 22 for use in the fuel combustion process.

Exhaust gas generated by the engine 22 is routed from the engine to an exhaust manifold 38. The exhaust manifold 38 extends to a muffler 40, which in mm has an exhaust pipe 42 extending therefrom. The exhaust pipe 42 comprises front and rear halves, with the downstream or free end 44 of the front half and the upstream end 46 of the rear half positioned within a water lock 48 formed in the lower portion 36 of the hull 26. This configuration of the exhaust pipe 42 prevents water from entering the engine 22. Exhaust passes through the manifold 38 and muffler 40 to the exhaust pipe 42 and from there is expelled into the water.

Figure 2:
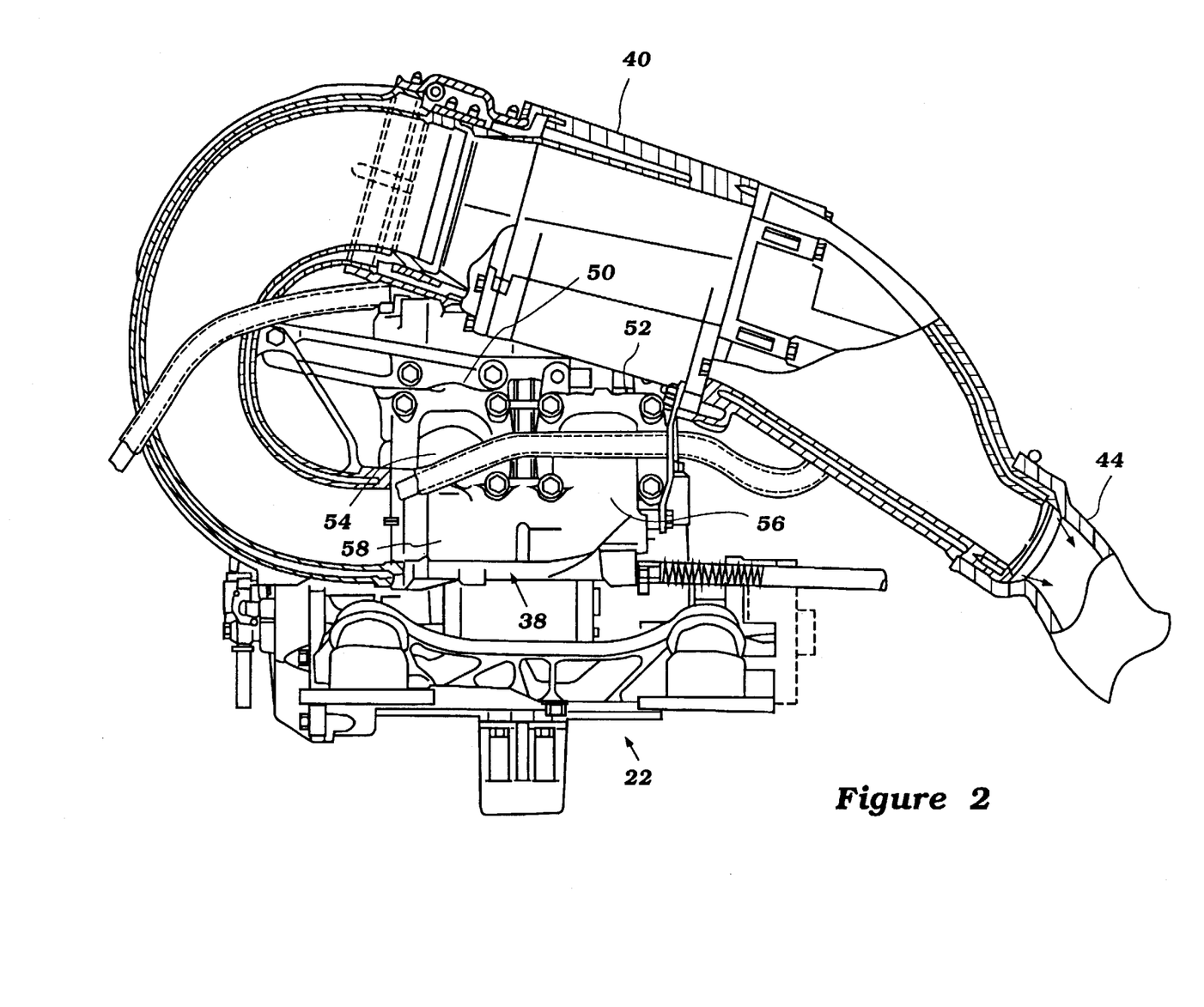
FIG. 2 is a side view, in partial cross-section, of the engine illustrated in FIG. 1.
Figure 3:
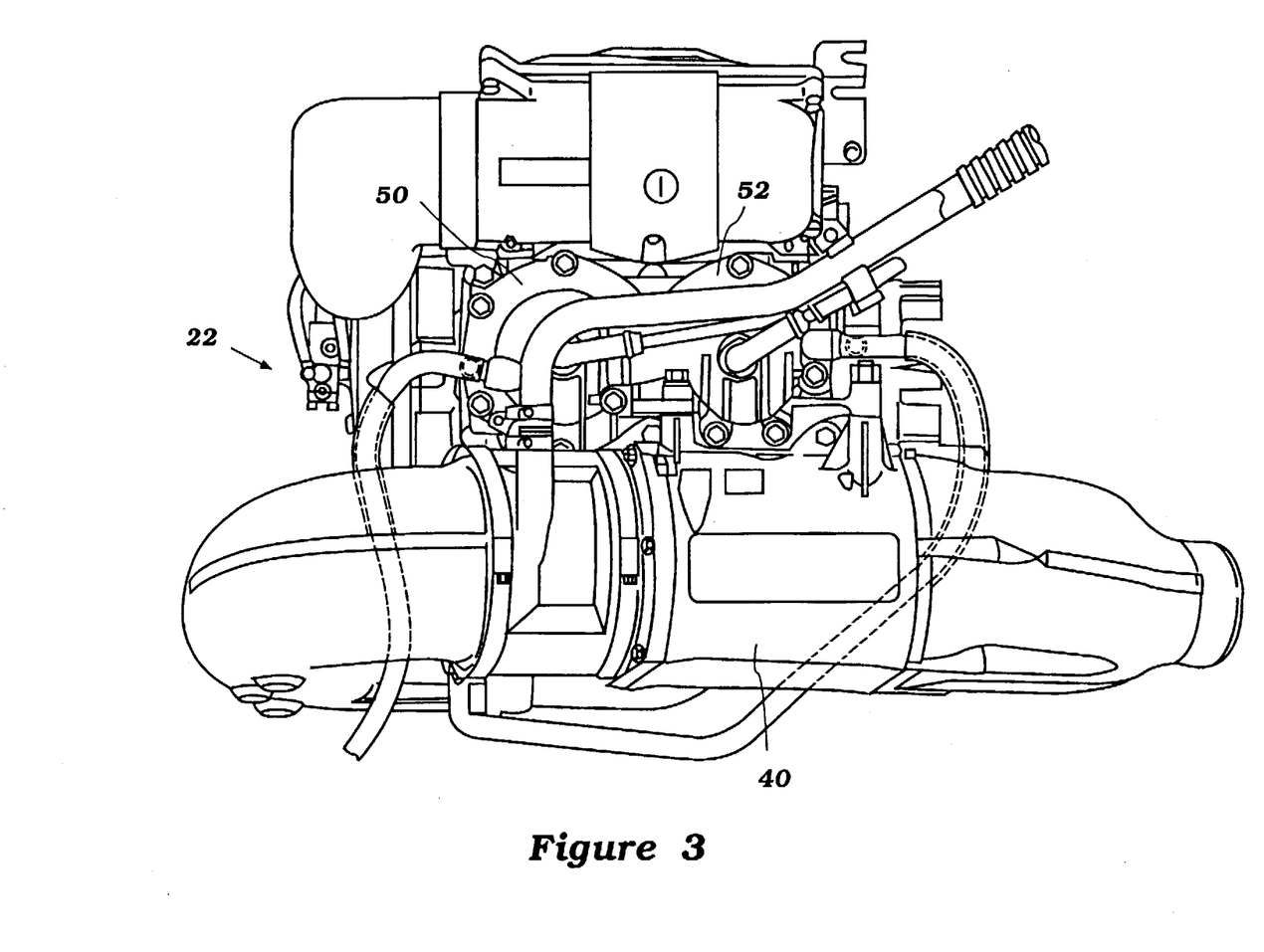
FIG. 3 is a top view of the engine illustrated in FIG. 2.
Figure 4:
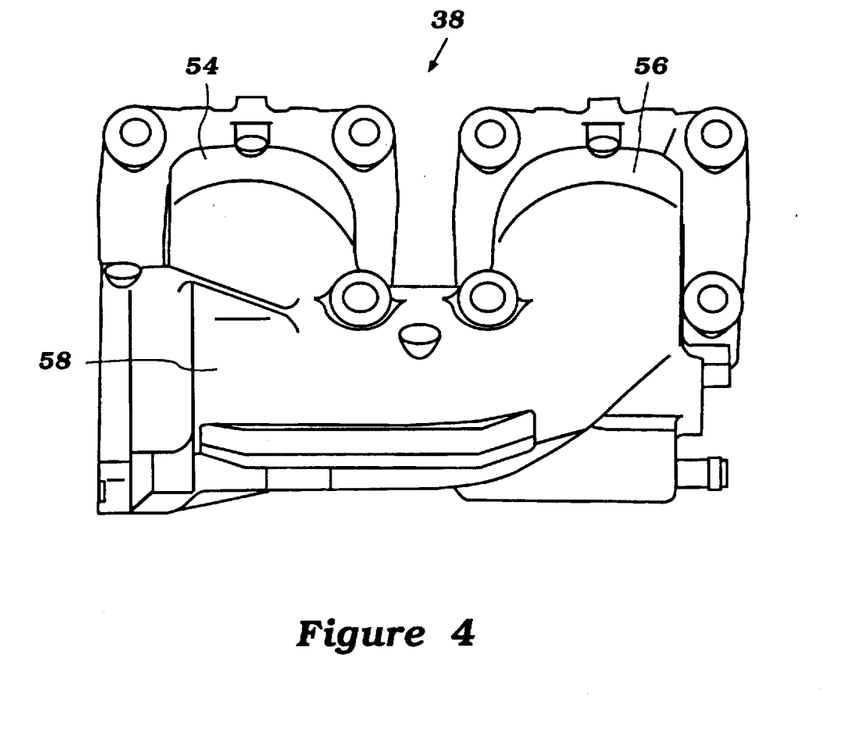
FIG. 4 is a side view of an exhaust manifold of the engine illustrated in FIG. 1.

As best illustrated in FIGS. 2–4, the engine 22 is preferably of the two-cylinder, two-cycle variety. One skilled in the art will appreciate that the engine operation control system 24 of the present invention may be adapted for use with engines of other types and configurations.

The engine 22 has a first or front cylinder 50 and a second or rear cylinder 52 with reference made to the position of the engine 22 within the hull 26 of the watercraft 20 as illustrated in FIG. 1. As best illustrated in FIGS. 2 and 4, the exhaust manifold 38 includes a first branch 54 which extends in communication with an exhaust outlet passage from the front cylinder 50, and a second branch 56 which extends in communication with an exhaust outlet passage from the second cylinder 52. These two branches 54,56 join at a joining portion 58 which is positioned adjacent the front cylinder 50.

In this exhaust system arrangement, exhaust efficiency is greater for the second or rear cylinder 52 than the front cylinder 50. As such, the rear cylinder 52 requires a greater amount of air/fuel mixture and the power and exhaust output of that cylinder are greater than the front cylinder 50. For the same reason, however, combustion temperatures are likely to be higher in the second cylinder 52 as compared to the first cylinder 50, and knocking is more likely to occur in the second as compared to the first cylinder.

A valve is provided corresponding to each exhaust port (not shown) corresponding to each cylinder 50,52. These exhaust valves open and close, controlling the flow of exhaust from each cylinder 50,52 into the exhaust passages and exhaust manifold 38. As is well known to those skilled in the art, the timing of the opening and closing of these valves is preferably such that the exhaust start timing is retarded at low engine rpm and advanced during higher engine rpm conditions. Further, when the engine 22 is being run in a controlled mode, such as when the engine is overheating and a misfire mode is adopted, the exhaust start time may be significantly retarded to lower the exhaust gas temperature.

Figure 5:
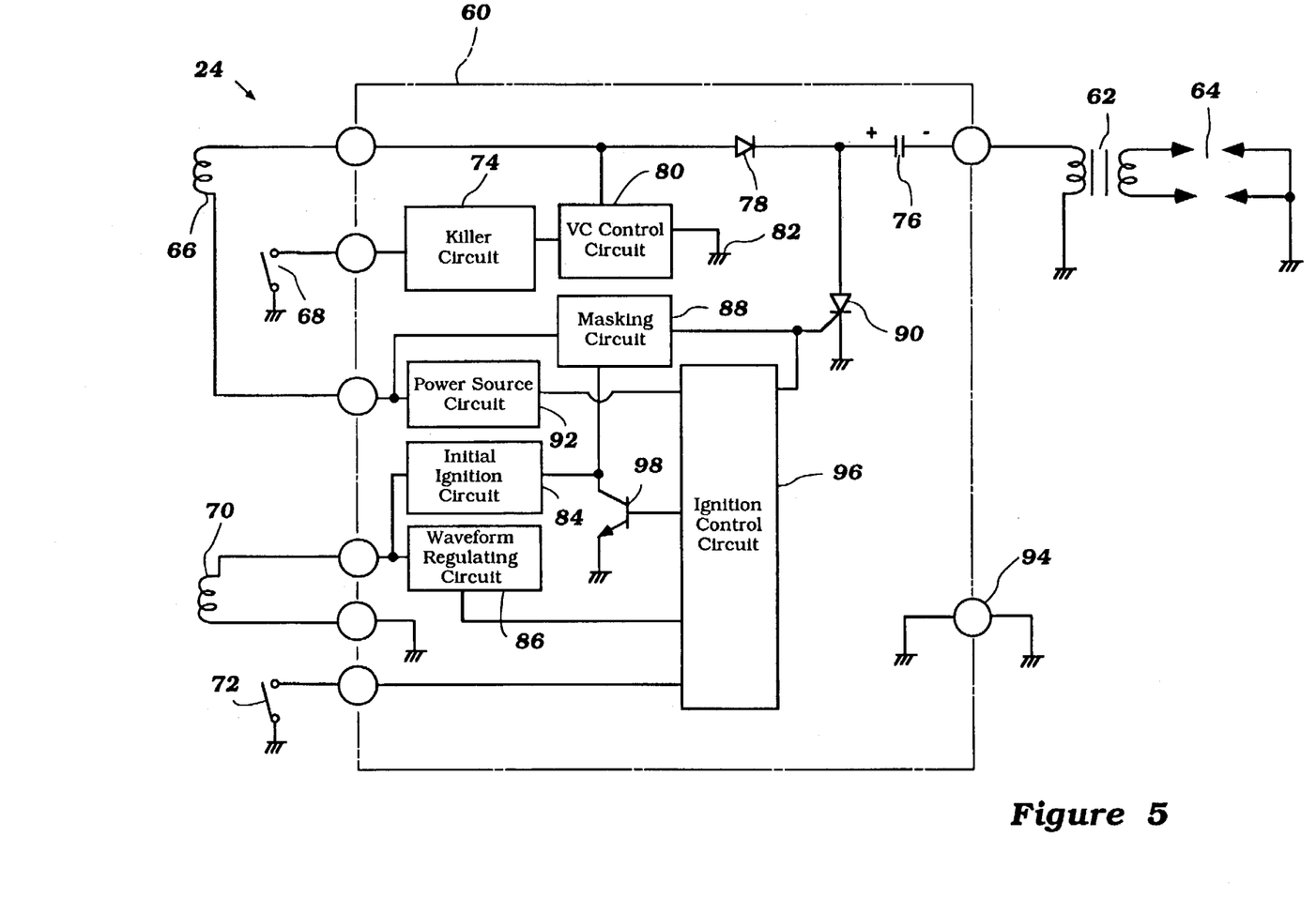
FIG. 5 is a diagram illustrating the engine operation control system of the present invention used with the engine illustrated in FIG. 1.

FIG. 5 best illustrates the engine operation control system 24 in accordance with the present invention. As illustrated therein, a charging coil 66 is provided for generating an ignition current. This ignition current is supplied to an ignition coil 62 and thereon to an ignition or spark plug 64 corresponding to each of the front and rear cylinders 50,52.

The system 24 of the present invention includes an ignition control system 60 for controlling the ignition timing of the ignition coil 62 and ignition or spark plug 64. The system 24 also includes a kill switch 68 for shutting down the engine 22, a pulser coil 70 for generating an ignition timing current, and a thermosensor 72 for detecting engine overheating.

The pulser coil 70 is preferably of the "outer" type, comprising a coil disposed outwardly of a flywheel (not illustrated) rotatably driven by the crankshaft of the engine 22. The flywheel has one or more projections (not illustrated) on the outer periphery thereof for inducing a current in the coil of the pulser coil 70. The system 24 of the present invention preferably includes a pulser-type coil 70 as the wave form of the pulse therefrom varies little even when the engine rpm varies.

The ignition control system 60 includes a capacitor 76 for storing an ignition charged from the charging coil 66 and a diode 78 for preventing the reverse or inverse flow of the electric charge stored in the capacitor 76. A voltage control circuit 80 is provided for regulating the current to the capacitor 76 by relieving, if necessary, part of the current from the charging coil 66 to a ground 82. A kill circuit 74 operates the kill switch 68 for grounding out the ignition system and shutting down the engine 22.

In accordance with the system 24 of the present invention, the ignition timing is controlled in a first and a second ignition control mode. In general, in the first ignition control mode, the system 24 controls the ignition timing in a predetermined manner which is independent of the sensed rotational speed of the engine. In the second ignition control mode, the system 24 controls the ignition timing primarily in accordance with required engine performance for the sensed engine speed, where the ignition advance for the ignition element of each cylinder varies to provide optimum engine performance.

In accordance with the engine operation system 24 of the present invention, the ignition control system 60 includes an initial ignition circuit 84 for carrying out the first ignition control mode. Here, the pulser coil 70 output is input into the initial ignition circuit 84. The initial ignition circuit 84 manipulates the output of the pulser coil 70 to control the ignition pulse timing signal. The output of the initial ignition circuit 84 is outputted to a wave form regulating circuit 86 which converts ignition pulse timing signal into a rectangular wave output. This signal is further processed by a masking circuit 88 which masks cylinder distinguishing signals. This output signal is utilized to control a thyristor 90, which in turn controls the flow of primary current from the generating coil 66 to the ignition coil 62.

The first ignition control mode is preferably operated from engine 22 idle speed up to a predetermined low engine speed, as described in more detail below. During this mode of operation, the ignition timing as controlled by the initial ignition circuit 84 is independent of the engine rpm as sensed by the pulser coil 70 in relation to the flywheel speed.

The engine operating control system 24 of the present invention includes other circuit apparatus for accomplishing the second ignition control mode of the present invention. This circuitry includes an ignition control circuit 96 which controls ignition timing according to required engine performance characteristics corresponding to a sensed engine rpm, and not with reference to the preset initial ignition circuit 84.

As illustrated, the ignition control circuit 96 is powered by a power source circuit 92. A ground 94 is provided corresponding to the ignition control circuit 96. Also provided is a transistor 98 positioned between the initial ignition circuit 84 and the ignition control circuit 96.

In general, the ignition control circuit 96 utilizes the transistor 98 to prevent the operation of (by grounding) the initial ignition circuit 84. The output of the pulse coil 70 is passed through the wave form regulating circuit 86 and masking circuit 88 described above. The ignition control circuit 96 turns on and off the thyristor 90 for controlling the primary current flow from the charging coil 66 to the ignition coil 62. In particular, when a current pulse from the pulser coil 70 is inputted to the ignition control circuit 84, the ignition control circuit turns on thyristor 90. This has the effect of grounding or stopping the primary current flow from the charging coil 66 to the ignition coil 62. When the ignition control circuit 96 turns off the thyristor 90, primary current flows from the charging coil 66 to the ignition coil 62, firing the ignition plug 64.

The ignition control system 60 preferably includes a thermosensor 72. The thermosensor 72 provides engine temperature data to the ignition control system 60. As described below, when the thermosensor 72 indicates an engine overheating condition, the ignition control system 60 preferably adopts a misfire condition for reducing engine temperature.

Figure 6:
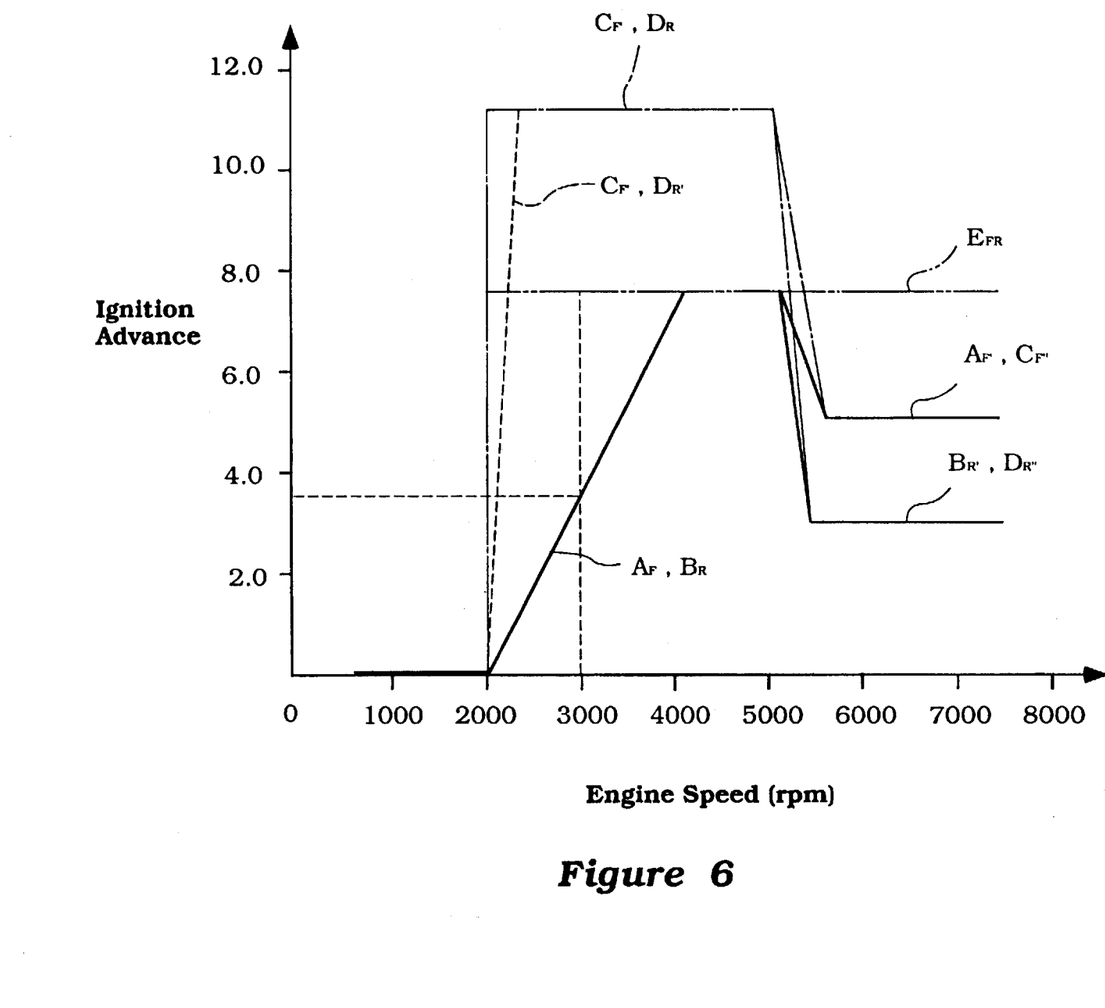
FIG. 6 graphically illustrates the relationship of ignition advance to engine speed employed by the engine operation control system of the present invention.
Figure 7:
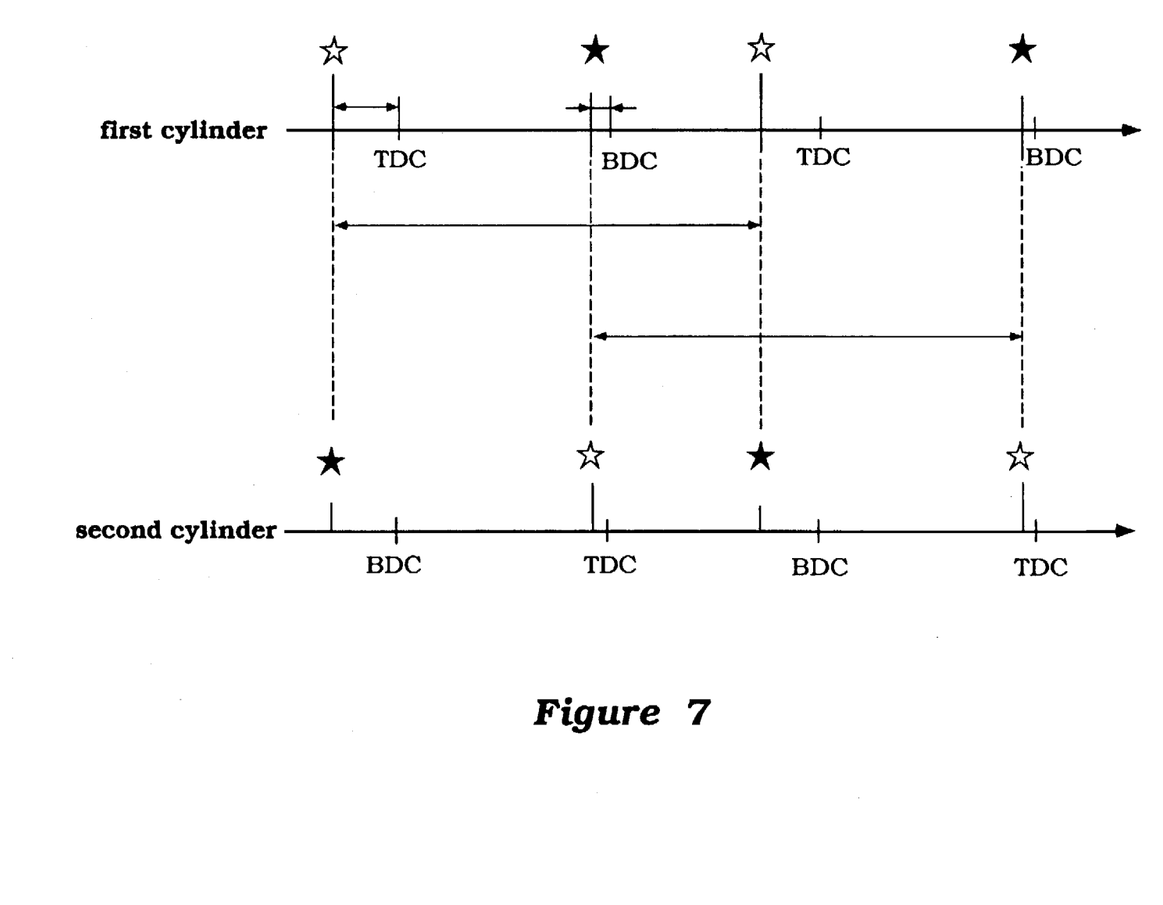
FIG. 7 illustrates the ignition timing of each cylinder of the engine illustrated in FIG. 1 employing the engine operation control system of the present invention.

Preferably, the initial ignition and ignition control circuits 84,96 are configured to operate such that the ignition timing is as illustrated in FIGS. 6 and 7. FIGS. 6 and 7 illustrate graphically certain characteristics for the engine 22 operated with the engine operation control system 24 described above. It will be understood to those skilled in the art that the engine speeds set forth below are merely representative and could vary from the values set forth therein.

FIG. 6 illustrates the relationship of engine speed (RPM) and the ignition timing (advance, in crank angle degrees). In this figure, fifteen degrees (15°) before top dead center (BTDC) is preferably taken as zero degrees (0°) advance. Characteristic curves $A_F$ and $B_R$ (where "F" indicates that the curve corresponds to the "front" or first cylinder 50 and the "R" indicates that the curve corresponds to the "rear" or second cylinder 52) correspond to when the engine is operated in the first ignition control mode. Characteristic curves $C_F$ and $D_R$ correspond to when the engine is operated in the second ignition control mode. Characteristic curve $E_{F,R}$ corresponds to an engine operation condition where the engine is overheated.

In accordance with the engine operation control system 24 of the present invention, when the engine 22 is started and in the engine operating range from idling speed (for example, 1500 rpm) up to a predetermined low engine speed (for example, 2000 rpm), the system 60 controls the ignition timing in accordance with the first ignition control mode. Herein, the ignition control circuit 96 turns off the transistor 98. Transformed pulse signals from the pulser coil 70 are supplied from the initial ignition circuit 84 through the masking circuit 88 to the thyristor 90 in a manner by which the ignition timing is controlled so as to be constant. This ignition timing is controlled based on the overall engine rpm, and not the pulse signal generated by the pulser coil 70, which may vary in frequency during each flywheel revolution. During this mode of operation, the ignition timing is preferably the zero or baseline setting. In the preferred embodiment, this baseline setting corresponds to an ignition advance of fifteen degrees (15°), as stated above.

As best illustrated by the curves labeled $A_F$ and $B_R$ (again, where "F" indicates that the curve corresponds to the "front" or first cylinder 50 and the "R" indicates that the curve corresponds to the "rear" or second cylinder 52) in FIG. 6, when the engine speed exceeds the predetermined low speed (ex. 2000 rpm), the system 20 controls the ignition timing in accordance with the second ignition control mode. Herein, the ignition control circuit 96 turns on the transistor 98, thereby grounding the initial ignition circuit 84. The pulser coil 70 supplies a pulse signal (which is manipulated by the wave form regulating circuit 86) to the ignition control circuit 96 for mining on and off the thyristor 90. The ignition control circuit 96 manipulates the state of the thyristor 90 so as to increase the ignition timing advance angle as the engine speed increases. Preferably, in the second mode of operation, the maximum ignition advance is seven degrees (7°) (i.e. 22° BTDC), with this ignition timing advance angle maintained to speeds exceeding a predetermined high engine speed, such as 4000 rpm.

If the engine 22 is rapidly accelerated from idling to high rpm, a similar control strategy is employed. At engine speeds up to a predetermined low speed (for example, 2000 rpm) the ignition timing is kept at the baseline or "zero" ignition advance (i.e. 15° BTDC in the preferred embodiment) by the initial ignition circuit 84. Once the engine speed exceeds the predetermined low speed, the ignition control circuit 96 advances the ignition timing up to a maximum advance of eleven degrees (11°) (i.e. 26° BTDC). This operational mode is illustrated by the curves $C_F$ and $D_R$ in FIG. 6. It will be understood that some time may elapse during which the ignition advance is advanced to this eleven degree (11°) value, as illustrated by the characteristic curves $C''_F$ and $D'_R$ in FIG. 6.

If engine 22 overheating is detected by the thermosensor 72, such as at engine speeds of over 4000 rpm, the ignition control circuit 96 turns on and off the thyristor 90 in a manner whereby the ignition mechanisms corresponding to the first and second cylinders 50,52 are alternatively missed, so as to lower the engine rpm (for example, to 3000 rpm). In this instance, the advance of the ignition timing at the operating cylinders (both cylinders 50,52) is controlled, as illustrated by the characteristic curve $E_{F,R}$ in FIG. 6, to be seven and one-half degrees (7.5°). This ignition advance value is preferably larger than the ignition advance in normal engine operation (which, as illustrated by characteristic curves $A_F$ and $B_R$, would normally be about 3.5° at 3000 engine rpm). In addition, along with the ignition timing control, the exhaust control valve is preferably controlled so that the exhaust starting timing is retarded from the ordinary one corresponding to the engine speed of 3000 rpm.

Whether the engine 22 is being operated normally or in a mode of acceleration (i.e. curves $A_F$, $B_R$, $C_F$ or $D_R$), the ignition advance is reduced when the engine speed exceeds a very high engine rpm (ex. 5100 rpm) for the primary purpose of preventing knocking from occurring. In this case, the ignition advance is preferably set larger for the first cylinder 50 as compared to the second cylinder 52. In a preferred embodiment, the ignition advance for the first cylinder 50 is five degrees (5°) (i.e. 20° BTDC) and three (3°) (i.e. 18° BTDC) for the second cylinder 52. The characteristic curves of these ignition advance states are illustrated as curves $A_F'/C_F''$ and $B_R'/D_R''$ in FIG. 6.

When the engine speeds exceeds a predetermined high speed (ex. 5100 rpm) the first cylinder 50 is thus effectively ignited at twenty degrees (20°) before top dead center and ineffectively ignited at eighteen degrees (18°) before bottom dead center. On the other hand, the second cylinder 52 is effectively ignited at eighteen degrees (18°) before top dead center and ineffectively ignited at twenty degrees (20°) before bottom dead center. In other words, since the first cylinder 50 (which has a low exhaust gas dischargeability) is ineffectively ignited when the exhaust gas is more completely discharged, bridging (i.e. short-circuiting) of the ignition spark plug gap can be prevented.

FIG. 7 illustrates the ignition timings of the ignition elements corresponding to the first and second cylinders 50,52, respectively, at this high engine speed. In this figure, the white star marks show the effective ignition firings and the black star marks indicate ineffective ignition timings. The engine control fires both elements simultaneously, one cylinder fired effectively and the other ineffectively.

Advantageously, however, the effective firing of each cylinder 50,52 is optimized even though both cylinders are fired simultaneously. As illustrated, the first cylinder 50 is effectively fired twenty degrees (20°) before top dead center thereof (and the second cylinder 52 is ineffectively fired at the same time at eighteen degrees before bottom dead center), while the second cylinder 52 is effectively fired eighteen degrees (18°) before top dead center thereof (and the first cylinder 50 is ineffectively fired at the same time at twenty degrees before bottom dead center). In this arrangement, the interval between each effective firing of the first cylinder 50 is spaced by one-hundred eighty degrees (180°), as are the effective firings of the second cylinder 52. When utilizing the ignition advances set forth above, the interval between the effective firing of the first cylinder 50 and effective firing of the second cylinder 52 is, however, more than the hundred eighty degrees (180°) and the interval between the effective ruing of the second cylinder 52 and the next effective firing of the first cylinder 50 is less than one hundred eighty degrees (180°). Of course, one skilled in the art will appreciate that these intervals will change dependent upon the firing advance utilized for the effective firing of each cylinder 50,52.

The system 24 and its method of use in conjunction with an engine 22 has numerous advantageous over the prior art. First, the system 24 of the present invention allows for independent effective ignition timings of the first and second cylinders 50,52. In this manner, ignition timing can still be controlled so as to correspond to the required firing characteristics of each cylinder and obtain optimum engine performance. At the same time, the system 24 is arranged such that both cylinders are ignited simultaneously, avoiding the need for a distinguishing apparatus. Still further, the advance angle of the ineffective ignition from BDC (bottom dead center) of the first cylinder 50 may be made smaller than that of the second cylinder 52, whereby the ineffective ignition timing of the first cylinder becomes later and short-circuiting of the ignition plug by the unburned component in the exhaust gas is prevented (as a result of the fact that the ineffective ignition is carded out in the first cylinder after the exhaust gas has been discharged).

Further, as disclosed above, the wave form of the signal produced by the "outer" type pulser coil 70 disclosed above does not change significantly with respect to engine speed. In this manner as well, fluctuation in ignition timing is prevented.

Since the ignition timing is advanced to its maximum advance angle when the engine 22 is accelerated from idling, the acceleration responsiveness of the engine is improved. In particular, since the advancing is carried out only after the engine speed reaches a predetermined low speed which is higher than the idle speed, an engine speed fluctuation during the idling is not mistaken to be an increase in engine speed resulting from the start of acceleration.

In accordance with the operating system of the present invention, in the high speed engine operating range (for example, 5100 rpm or more) ignition advance is reduced. This reduction in ignition advance has the effect of reducing the occurrence of knocking. Notably, the ignition advance corresponding to the second cylinder 52 is smaller than that corresponding to the first cylinder 50, due to the fact that the second cylinder 52 discharges more exhaust gas, produces more power, takes in more air and is otherwise more susceptible to knocking.

Still further, when engine overheating is detected, the ignition advance of the operating cylinders 50,52 is made larger than the ignition timing which would normally be employed for the same engine speed under normal operating (i.e. no overheating) condition. At the same time, the engine rpm is lowered by misfiring the cylinders and thus suspending ignition. In this arrangement, the exhaust gas temperature is lowered, but at the same time, the gas is fully combusted, and does not combust in the exhaust system (i.e. no backfire occurs).

It should be understood by one skilled in the art that the system 24 could be arranged so that the ignition firing is optimized at all engine speeds, instead of just an operational speed above a predetermined speed. In addition, the exact ignition timing advance values and/or engine speed values may vary from those which are given by way of illustration above, depending upon the type of engine and its application.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. An engine operation control system for use with an internal combustion engine having a first variable volume combustion chamber having a first ignition element corresponding thereto, and a second variable volume combustion chamber and a second ignition element corresponding thereto, said engine operation control system firing said first and second ignition elements simultaneously but such that said first ignition element is fired in accordance with a first ignition advance when said first chamber is prepared for combustion, and such that said second ignition element is fired in accordance with a second ignition advance when said second combustion chamber is prepared for combustion, said first and second ignition advances being unequal.

2. The engine operation control system in accordance with claim 1, wherein said first firing advance is larger than said second firing advance.

3. A method of controlling the firing of the ignition elements corresponding to the variable volume combustion chambers of an engine including at least two of said chambers comprising the steps of: firing one of said ignition elements effectively and all other ignition elements ineffectively in accordance with a first firing advance, and firing another of said ignition elements effectively and all other ignition elements ineffectively in accordance with a second firing advance, said first and second firing advances being independent of one another.

4. The method in accordance with claim 4, wherein said first firing advance is different than said second firing advance.

5. The method in accordance with claim 4, wherein said engine has two variable volume chambers and a first and a second ignition element corresponding thereto, and wherein said first firing advance corresponding to the effective firing of said first element is greater than the second firing advance corresponding to the effective firing of said second element.

6. A method for controlling the firing of ignition elements corresponding to the variable volume combustion chambers of an engine containing at least two of said chambers comprising the steps of firing all ignition elements at a first time corresponding to a first engine condition and firing all ignition elements at a second time corresponding to a second engine condition, and repeating said firing sequence of firing at said first and second times thereafter, the time interval between said first time and second time being unequal to the time interval between said second time and said first time.

* * * * *